(12) United States Patent
Wang et al.

(10) Patent No.: US 8,605,795 B2
(45) Date of Patent: Dec. 10, 2013

(54) VIDEO EDITING METHODS AND SYSTEMS

(75) Inventors: Patricia P. Wang, Beijing (CN); Yimin Zhang, Beijing (CN); Tao Wang, Beijing (CN); Jianguo Li, Beijing (CN)

(73) Assignee: Intel Corporation, Santa Clara, CA (US)

( * ) Notice: Subject to any disclaimer, the term of this patent is extended or adjusted under 35 U.S.C. 154(b) by 1179 days.

(21) Appl. No.: 12/211,883

(22) Filed: Sep. 17, 2008

(65) Prior Publication Data

US 2010/0067863 A1 Mar. 18, 2010

(51) Int. Cl.
*H04N 7/18* (2006.01)
(52) U.S. Cl.
USPC .................................................. 375/240.26
(58) Field of Classification Search
USPC .................. 375/240.01–240.29; 348/143–160
See application file for complete search history.

(56) References Cited

U.S. PATENT DOCUMENTS 7,310,589 B2 * 12/2007 Li ................................. 702/179

OTHER PUBLICATIONS

Cai, et al., "Automated Music Video Generation Using Web Image Resource", IEEE ICASSP, 2007, 4 pages.
Du, et al., "Distributing Expressional Faces in 2-D Emotional Space", CIVR, Amsterdam, The Netherlands, Jul. 9-11, 2007, pp. 395-400.
Duan, et al., "Shot-Level Camera Motion Estimation Based on a Parametric Model", Participant Notebook Papers in TRECVID, 2005, 7 pages.
Gao, et al., "Cast Indexing for Videos by NCuts and Page Ranking", CIVR Amsterdam, The Netherlands, Jul. 9-11, 2007, pp. 441-447.
Hua, et al., "Automatic Music Video Generation Based on Temporal Pattern Analysis", MM, New York, USA, Oct. 10-16, 2004, 4 pages.
Ke, et al., "The Design of High-Level Features for Photo Quality Assessment", IEEE, 2006, 8 pages.
Shamma, et al., "MusicStory: A Personalized Music Video Creator", MM, Singapore, Nov. 6-11, 2005, 4 pages.
Tong, et al., "Body Detection and Tracking with Hierarchical Scheme in Dynamic Scenes", IEEE, ICME 2007, pp. 975-978.
Wang, et al., "Realtime Detection of Salient Moving Object: A Multi-Core Solution", IEEE, ICASSP 2008, 4 pages.
Wang, et al., "THU-ICRC At Rush Summarization of TRECVID 2007", TVS, Augsburg, Bavaria, Germany, Sep. 28, 2007, 5 pages.
Wu, et al., "Robust Speaking Face Identification for Video Analysis", PCM, LNCS 4810, 2007, pp. 665-674.
Yuan, et al., "A Formal Study of Shot Boundary Detection", IEEE Transactions on Circuits and Systems for Video Technology, vol. 17, No. 2, Feb. 2007, pp. 168-186.
Zhang, et al., "A System for Automatic Generation of Music Sports-Video", IEEE, 2005, 4 pages.
Thefreedictionary.com, "rhythm", Jan. 31, 2013, pp. 3 available at: http://www.thefreedictionary.com/p/rhythm.

* cited by examiner

*Primary Examiner* — Andy Rao
(74) *Attorney, Agent, or Firm* — Garrett IP, LLC

(57) ABSTRACT

Video editing methods and systems, including methods and systems to identify video clips having similar visual characteristics. Video clips may correspond to first and second videos, which may include a professional music video and a personal video, respectively. Identified video clips of the personal video may be combined into a new video clip, and music corresponding to visually similar video clips of the music video may be associated with the corresponding video clips of the new video. Video frames of the video clips may be characterized with respect to one or more visual features, which may include one or more of facial and/or body features, salient objects, camera motion, and image quality. Characterizations may be compared between video clips on an incremental basis. Characterization of a music video may implicitly model an underlying correlation between music rhythm and changes in visual appearance.

24 Claims, 5 Drawing Sheets

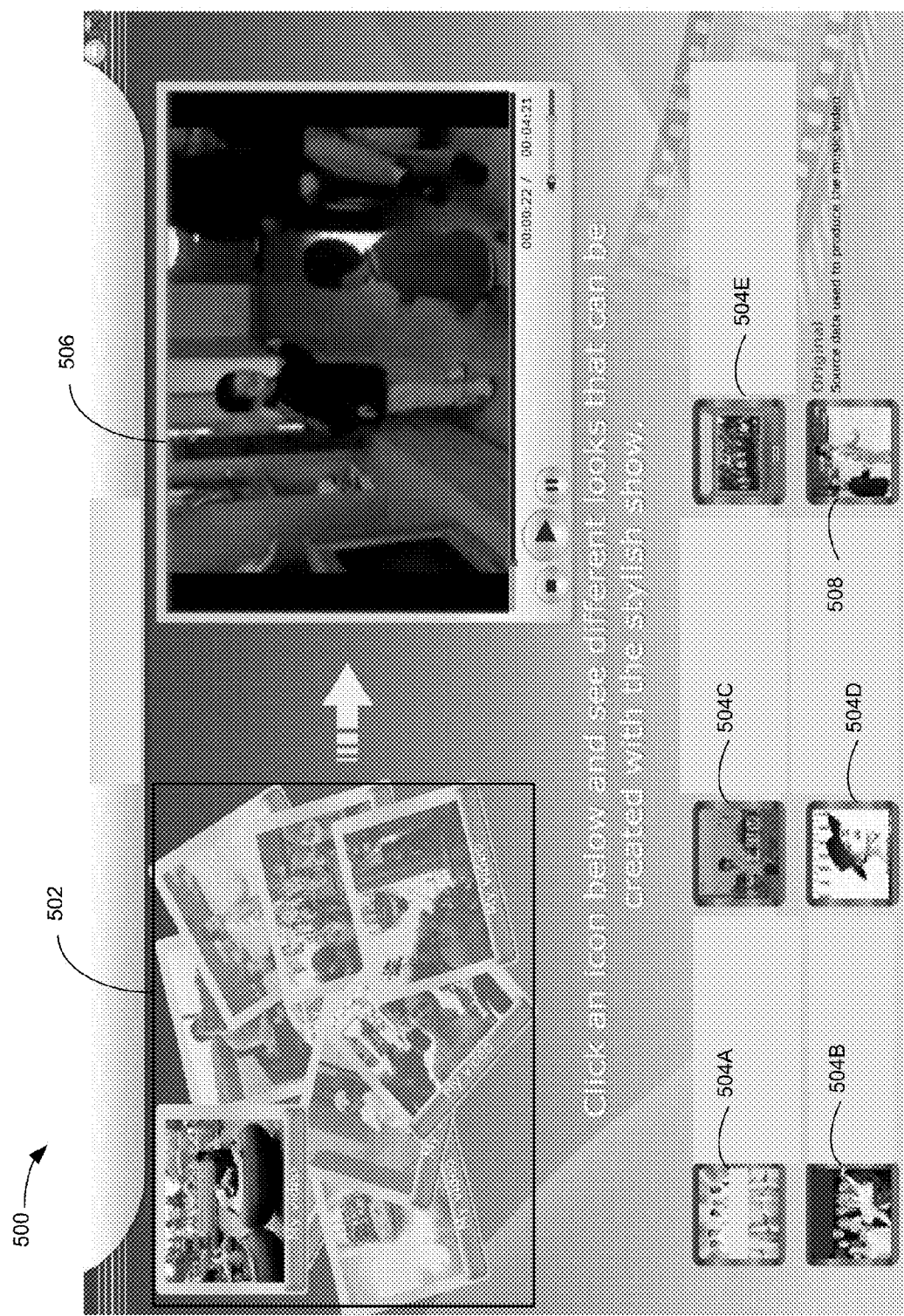

VIDEO EDITING METHODS AND SYSTEMS

BACKGROUND

Consumer video cameras have become ubiquitous, and may be found in wireless telephones, digital cameras, camcorders, and other portable consumer electronic devices.

Sophisticated, professional-level video editing systems are relatively expensive and require technical expertise to operate.

Less sophisticated, consumer-grade video editing systems are laborious, time consuming, and provide relatively limited video editing capabilities.

BRIEF DESCRIPTION OF THE DRAWINGS/FIGURES

FIG. 5 is an exemplary graphical user interface.

Figure 1:
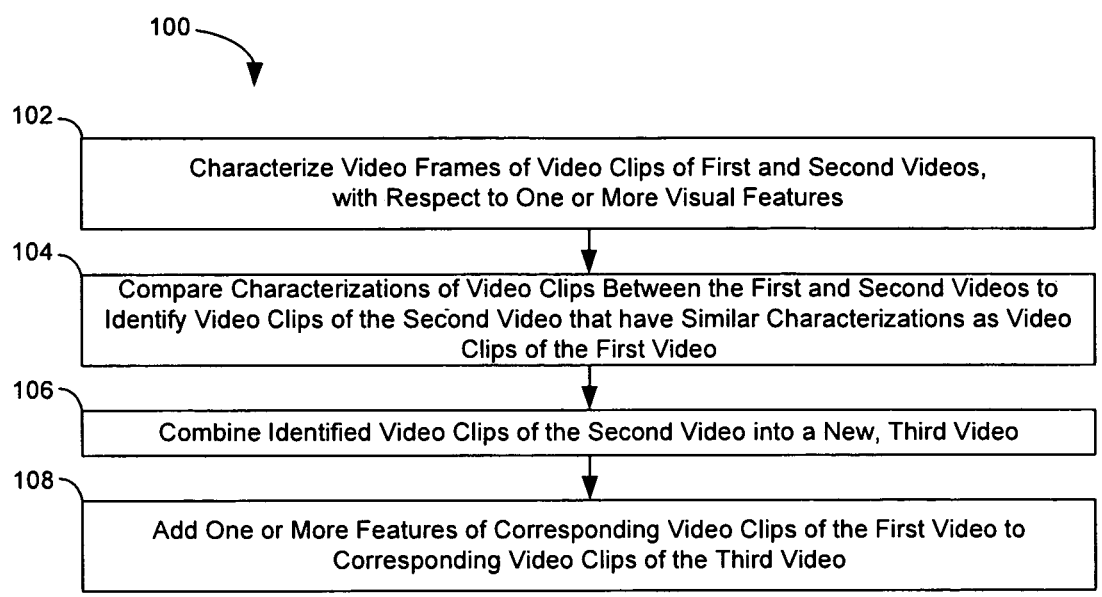
FIG. 1 is a process flowchart of an exemplary method of video editing.

In the drawings, the leftmost digit(s) of a reference number identifies the drawing in which the reference number first appears.

DETAILED DESCRIPTION

Disclosed herein are video editing methods and systems, including methods and systems to identify video clips of a personal or home video having similar visual characteristics as video clips of a music video, to combine the identified video clips of the personal video into a new video, and to merge corresponding music of the music video with the new video.

FIG. 1 is a process flowchart of an exemplary method 100 of editing video.

At 102, video frames within each of a plurality of video clips of first and second video streams are characterized with respect to one or more visual features. Visual features may include, without limitation, one or more of facial and/or body features, saliency, camera motion, and image quality.

Facial features may include, without limitation, one or more of a number of faces, facial positioning, facial perspective, facial motion relative to one or more other frames, and facial expression. Body features may include, without limitation, one or more of a number of bodies, body positioning, body perspective, and body motion relative to one or more other frames. Facial feature characterizations may be represented as $F_{face}=(N_{face}, P_{face})$, where $N_{face}$ denotes a number of faces within a frame, and where $P_{face}=[x_{left}, x_{right}, y_{top}, y_{down}]$ denotes a position of each detected face.

Facial and/or body features may be identified and characterized in accordance with one or more facial and/or body detection and tracking techniques, cast indexing techniques, speaker identification techniques, and facial expression determination techniques.

Saliency or region of interest characterization may include distinguishing one or more regions whose appearances in color, texture, and/or motion are distinct from background regions. Exemplary methods and systems to identify and characterize salient objects are disclosed below with respect to FIG. 3. Saliency characterization may be represented as an object saliency feature, or motion region-of-interest feature, $F_{MROI}=[w_{ij}]_{W\times H}$, where W and H denote width and height of video frame, respectively, and where $w_{ij}\in [1, Q]$ denotes a saliency weight of each pixel on a scale of one to Q.

Camera motion characterization may include determining motion relative to one or more time-proximate video frames, and may include one or more motion estimation techniques. Camera motion characterization may be represented as a camera movement feature, $F_{camera}=(\bar{x},\bar{y},\bar{z})$, where $\bar{x},\bar{y},\bar{z}$ denotes a camera motion vector in horizontal, vertical, and depth directions, respectively.

Image quality characterization may include, without limitation, one or more of blur, lightness, hue count, edge distribution, color distribution characterizations. Image quality characterization may include a quality feature extraction technique. Image quality characterization may be represented as an image quality feature, $F_{quality}=(f_{blur}, f_{light}, f_{hue}, f_{edge}, f_{color})$, where $f_{blur}, f_{light}, f_{hue}, f_{edge}, f_{color}$ denote blur, lightness, hue count, edge distribution, and color distribution, respectively.

At 104, the video frame characterizations corresponding to video clips of the first and second videos are compared to one another to identify video clips that have similar characterizations.

Where multiple video clips of the second video are identified as being similar to a video clip of the first video, the multiple video clips of the second video may be further analyzed or compared to select one for use in a new video, as described below with respect to 106.

Video clips of the first and second videos may be compared using an incremental feature-by-feature approach, as disclosed below with respect to FIG. 2. Alternatively, or additionally, a plurality of features may be compared together.

At 106, selected video clips of the second video are combined into a new, third video.

At 108, one or more features of the corresponding video clips from the first video are added to corresponding video clips of the new video. For example, and without limitation, the first video may include a professional-quality music video, wherein one or more of visual scenes and motion are correlated with accompanying music, and the second video may be a personal or home video. At 108, music from corresponding video clips of the music video may be added to corresponding similar video clips of the new video.

Identification of video clips from a personal video having similar features as the music video, implicitly models the new video according to the music of the music video. In other words, the frame characterizations of the first video implicitly provide editing rules to select video clips of the second video so that, in terms of human perception, color tone and camera movement substantially correlate to the music of the music video, similar to correlations between images of the first video and the accompanying music.

Method 100 is extensible and scalable with improvements in video characterization techniques, such as pose recognition, action recognition, facial expression recognition, and object detection.

Method 100 may be preceded by automated identification, or selection of video clips from the first and second videos, for use in accordance with method 100. Video clip identification may include segmenting a video stream into video clips having relatively consistent content, or relatively little change amongst video frames of corresponding video clips. Video clip identification may include a rush video summarizing technique. Rush videos have relatively disorganized structure, which may include substantially un-edited videos. Rush videos may include one or more of relatively irrelevant segments, multiple takes of a same scene, and relatively long segments where the camera is substantially fixed on the same scene. Rush summarization may include one or more of key frame clustering, video parsing, irrelevant frame removal, redundancy removal, and important factor analysis.

Figure 2:
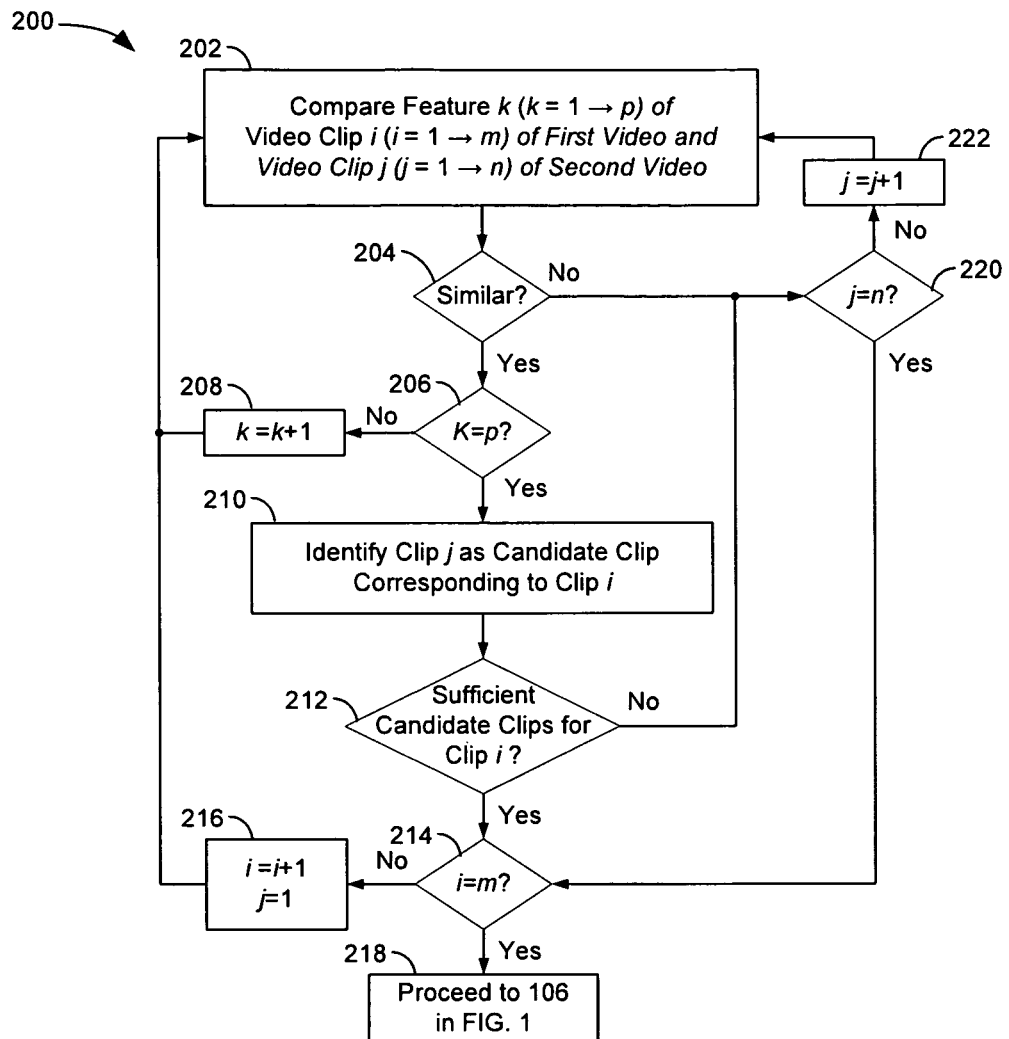
FIG. 2 is a process flowchart of an exemplary method of comparing characterizations of video frames corresponding to first and second video clips, on an incremental, feature-by-feature basis.

FIG. 2 is a process flowchart of an exemplary method 200 of comparing video clips based on characterizations of video frames within the video clips. Method 200 may be implemented as part of 104 in method 100.

Method 200 is described below for a first video having m video clips, a second video having n video clips, and a number p of characterized features, where m, n, and p are integers, and where m is incremented from i=1 to i=m, n is incremented from j=1 to j=n, and p is incremented from k=1 to k=p.

At 202, a first feature characterization (k=1) is compared between a first video clip of a first video (i=1) and a first video clip of a second video (j=1).

When the feature characterizations are similar at 204, k may be incremented at 208 and another feature characterization may be compared at 202 between the first video clips of the first and second videos. Incremental comparison of feature characterizations may continue until a feature characterization is determined to be dissimilar at 204, or until all features are compared, as determined at 206.

When a feature characterization is determined to be dissimilar at 204, j may be incremented at 222 to select another video clip of the second video for comparison to a current video clip of the first video. When all of the video clips of the second video have been compared to a current video clip of the first video, as determined at 220, processing may proceed to 214 as described below.

At 206, when all of the feature characterizations for a current set of video clips are determined to be similar, the corresponding video clip is identified at 210 as being a candidate video clip.

At 212, processing may return to 202, through 220 and 222, as described above, to identify one or more additional video clips from the second video as candidate clips corresponding to a current video clip of the first video.

When sufficient candidate video clips have been identified for a video clip of the first video at 212, or when all of the video clips of the second video have been compared to a current video clip of the first video at 220, another video clip of the first video may be selected for comparison to video clips of the second video. This is illustrated at 216, where i is incremented and j is reset, and processing returns to 202.

When all of the video clips of the first video have been compared to video clips of the second video at 214, processing may proceed to 106 in FIG. 1, as illustrated at 218. Candidate clips may be further processed to select from amongst multiple candidate clips of the second video, corresponding to a given video clip of the first video.

One or more features may be characterized in advance of method 200. Alternatively, or additionally, one or more features may be characterized at the time of comparison at 202.

Comparison at 202 may include a correlation of linear associations amongst multi-dimensional characterization variables. A correlation result may be between −1.0 and +1.0, wherein a more positive correlation indicates greater similarly.

Correlation may be performed as:

$$\text{correlation}(r) = \frac{N\sum XY - (\sum X)(\sum Y)}{\sqrt{([N\sum X^2 - (\sum X)^2][N\sum Y^2 - (\sum Y)^2])}},$$

where:
- X represents a feature characterization of a video clip corresponding to a first video (first video clip);
- Y represents the corresponding feature characterization of a video clip of a second video (second video clip); and
- N denotes a dimension of the feature characterization.

An exemplary correlation is described below with reference to Tables 1 and 2, where Table 1 illustrates an exemplary characterization for frames 1-g of a first video clip, and Table 2 illustrates an exemplary characterization for frames 1-g of a second video clip. Characterizations $X_1$ through $X_g$ and $Y_1$ through $Y_g$ may each have N dimensions, or variables.

TABLE 1

Feature Characterization of a First Video Clip

|  | Frame 1 | Frame 2 | Frame 3 | ... | Frame g |
|---|---|---|---|---|---|
| Characterization | $X_1$ | $X_2$ | $X_3$ |  | $X_g$ |

TABLE 2

Feature Characterization of a Second Video Clip

|  | Frame 1 | Frame 2 | Frame 3 | ... | Frame g |
|---|---|---|---|---|---|
| Characterization | $F_{face}=Y_1$ | $F_{face}=Y_2$ | $F_{face}=Y_3$ |  | $F_{face}=Y_g$ |

Figure 3:
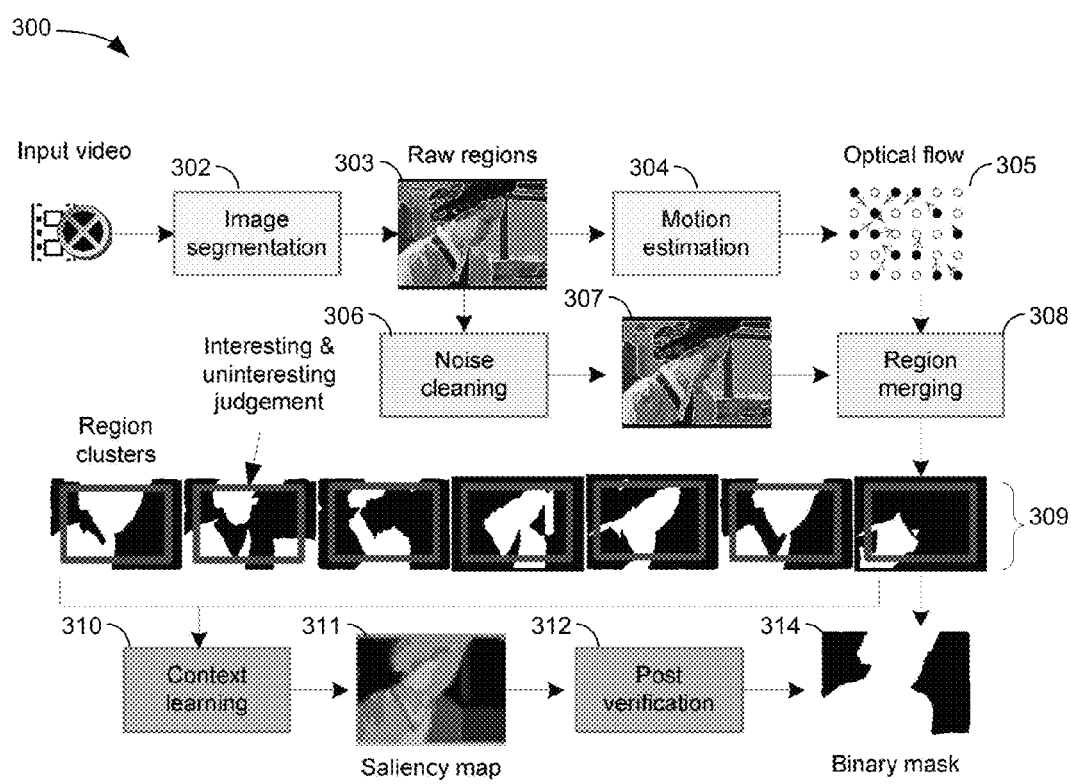
FIG. 3 is a process flowchart of an exemplary method of identifying salient objects, or regions of interest in video frames of a video clip.

In accordance with the correlation equation above:

$\Sigma XY = (X_1Y_1) + (X_2Y_2) + (X_3Y_3) + \ldots (X_gY_g)$ $\Sigma X = X_1 + X_2 + X_3 + \ldots X_g$ $\Sigma Y = Y_1 + Y_2 + Y_3 + \ldots Y_g$ $\Sigma X^2 = (X_1)^2 + (X_2)^2 + (X_3)^2 + \ldots (Xg)2$ $\Sigma Y^2 = (Y_1)^2 + (Y_2)^2 + (Y_3)^2 + \ldots (Yg)2$ $(\Sigma X)^2 = (X_1 + X_2 + X_3 + \ldots X_g)^2$ $(\Sigma Y)^2 = (Y_1 + Y_2 + Y_3 + \ldots Y_g)^2$ FIG. 3 is a process flowchart of an exemplary method 300 of identifying salient objects, or regions of interest, in video frames of a video clip. Method 300 may be implemented as part of 102 in method 100. Method 100 is not, however, limited to the example of method 300. Method 300 may be implemented with parallel processing.

At 302, one or more video frames of a video clip are segmented into object-based regions, also referred to herein as super-pixels, or raw regions, as illustrated in a video frame 303. Video frames may be segmented into color-texture homogenous regions.

A video frame may be segmented into a number of super-pixels, or raw regions according to a desired level of granularity. For example, and without limitation, a video frame may be segmented into tens of regions.

Segmentation may be performed with an Efficient Graph-Based Image Segmentation (EGBIS) algorithm. Corresponding free parameters may include σ and k, where σ smoothes an input image before prior to segmentation, and k defines a segmentation threshold. The parameters may be set to, for example, and without limitation, σ=0.5 and k=500. An input image of size W×H, may be represented with a segmentation mask $I_R=[r_{ij}]_{W \times H}$, where $r_{ij} \in \{1,\ldots,R\}$, and where R denotes the number of segmented regions.

At 304, motion characteristics are extracted from segmented regions. As described below, motion characteristics may be analyzed to identify regions that belong to a common object. Regions having relatively consistent motion direction and intensity, relative to a background region may belong to a common object.

Motion characterization may include an optical flow motion estimation technique to generate optical flow information 305. Optical flow may be defined as a velocity field that warps one image into an adjacent similar image. Optical flow estimation may include a block matching based technique. Optical flow may be quantized into nine (9) bins according to magnitude and direction. For each raw region, a nine (9) dimensional histogram may be calculated to characterize corresponding motion features, $F_m=[h_1,\ldots,h_9]$, where $h_i=n_i/\Sigma_j\{n_j\}$, and $n_j$ denotes a number of optical flow in the $j^{th}$ bin. A block size of eight (8) may be utilized.

At 306, raw regions of video frame 303 may be noise cleansed to remove inconsistencies and/or to reduce over-segmentation. Raw regions of adjacent frames may be may be inconsistent due to, for example, illumination or color quantization. To reduce noise disturbance, raw regions may be compared between adjacent frames, and corrections may be made to provide more consistency.

Motion detection at 304 and noise-cleansing at 306 may be performed in parallel.

At 308, cleansed raw regions within cleansed video frame 307 are grouped or associated with objects based on optical flow information 305. Raw regions 307 may be grouped or associated with one of two clusters, such as background for non-salient features, and foreground for salient features. A non-parametric clustering technique, such as a spectral clustering technique may be utilized to group raw regions.

Clustering may include defining edge weights. Edge weights may be defined as $w_{ij}=\exp(-d(v_i,v_j)^2/2\sigma_i^2)$, where $d(v_i,v_j)$ denotes a distance between data points $v_i$ and $v_j$, and $\sigma_i$ denotes a local scaling factor, which may vary for different local data groups to accommodate various cluster densities.

For relatively sparse data groups, scaling factor $\sigma_i$ may fall relatively rapidly with distance. For other data groups, scaling factor $\sigma_i$ may fall relatively slowly with distance. Scaling factor $\sigma_i$ may thus be defined as $\sigma_i=\Sigma j|v_j \in \Omega(v_i)d(v_i,v_j)/n_b$, where $\Omega(v_i)$ denotes the $n_b$ nearest neighborhoods of $v_i$. The nearest neighborhood $n_h$ may be set to, for example and without limitation, five (5). Edge weights may be defined as $w_{ij}=\exp(-d(v_i,v_j)^2/2\sigma_i\sigma_j)$.

Exemplary resultant region clusters are illustrated in video frames 309, where black denotes potential background features and white denotes potential salient objects.

At 310, space-time contexts of one or more video frames 309 are learned to verify object saliency. The learning may include comparing motion features, or space context of adjacent video frames.

Distinctions between backgrounds and foregrounds in video frames 309 may not be stable for consecutive video frames. Because motion characteristics in video tend to be sequential and smooth, the unstable results may be complementary for adjacent video frames. Accordingly, statistics associated with the background and foreground distinctions may be learned from consecutive video frames in a time context. In a probabilistic template, a lighter color determination corresponding to an object corresponds to a greater possibility that the object belongs to a salient object. Such a gray-level template is referred to herein as an object-level saliency map. An object-level saliency map may be used to predict a binary mask of a salient object for each frame. An exemplary object-level saliency map is illustrated at 311.

To learn statistics in space-time context, for each pixel (x, y), a probabilistic matrix may be determined as $$P(x,y) = \sum_{l=1}^{N} \delta(x,y)/N,$$

given a number of consecutive frames N, where $\delta(x,y)=1$ if (x, y) belong to an interesting, or foreground region cluster, otherwise $\delta(x,y)=0$. Evaluation of all or substantially all pixels within a video frame provides statistics in space-time context, represented in saliency map 311.

At 312, post verification may be performed. For a region r, given frame l, a conditional possibility of belonging to a salient moving object may be calculated as $$P_l(r) = \sum_{m=1}^{M} P_l(x_m^{(r)}, y_m^{(r)}),$$

where M denotes a number of pixels within region r.

Verification of salient objects with context learning results may include an adaptive criterion to identify relatively slow and fast movements. For example, a relatively small region may be more sensitive to motion changes between adjacent frames, compared to relatively large regions. Thus, a lower threshold may be used to identify salient movement between relatively small adjacent video frames, while a higher threshold may be used to identify salient movement between relatively large adjacent video frames. An adaptive technique may include determining that r belongs to an interesting, or salient region when $P_l(r) \geq \sqrt{S_r/S}$, where $S_r$ denotes a size of region r, and S denotes a size of a corresponding video frame.

The learning process described above may result in one or more binary masks, such as exemplary binary mask 314, in which relatively fine-grained shapes and boundaries are identified for the frame.

Figure 4:
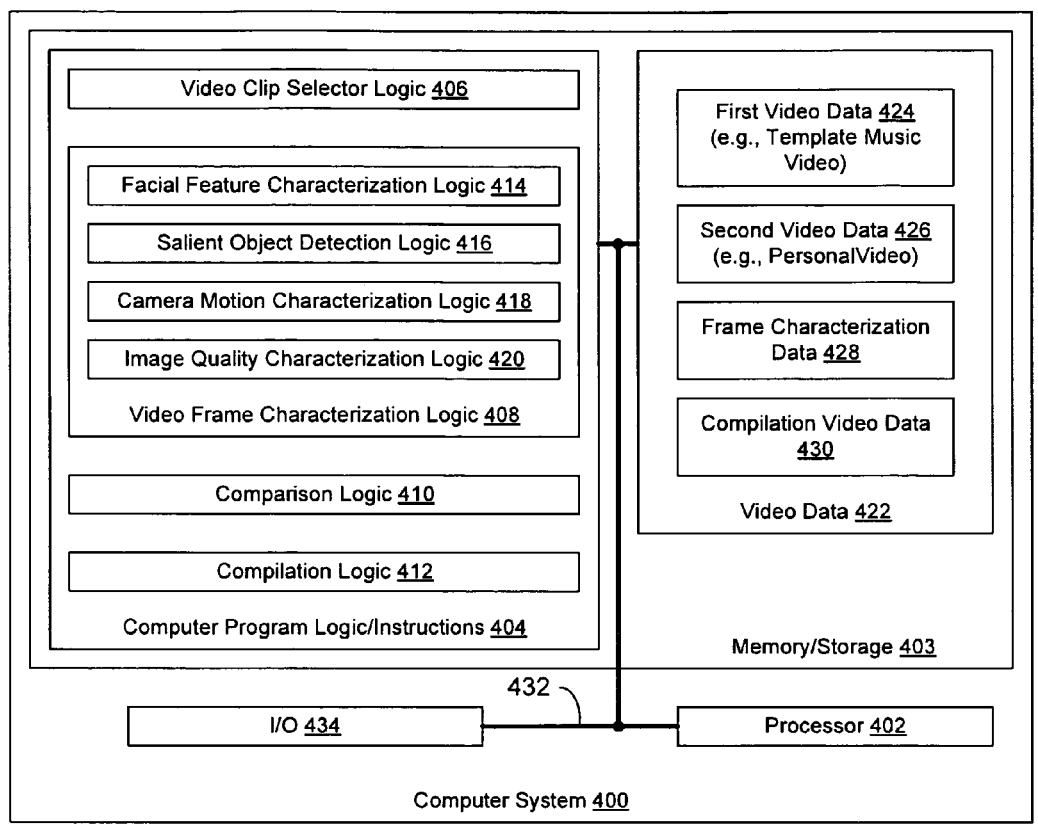
FIG. 4 is a block diagram of an exemplary computer system.

One or more methods disclosed herein, or portions thereof, may be implemented in logic, including computer program product logic, or instructions. FIG. 4 is a block diagram of an exemplary computer system 400, including one or more computer instruction processing units, illustrated here as processor 402, to execute computer program product logic, also known as instructions, code, and software.

Computer system 400 includes memory/storage 403, including a computer readable medium having computer program product logic, or instructions 404 stored thereon, to cause processor 402 to perform one or more functions in response thereto. Memory/storage 403 further includes video data 422 to be used by processor 402 in executing instructions 404, and/or generated by processor 402 in response to execution of instructions 404.

In the example of FIG. 4, instructions 404 include video clip selector logic 406 to cause processor 402 to select video clips from first and second video data 424 and 426, respectively, as described above.

Instructions 404 further include video frame characterization logic 408 to cause processor 402 to characterize the video frames of selected video clips, as described above with respect to 102 in FIG. 1.

Video frame characterization logic 408 may include, without limitation, one or more of facial feature characterization logic 414, salient object detection logic 416, camera motion characterization logic 418, and image quality characterization logic 420.

Instructions 404 further include comparison logic 410 to cause processor 402 to compare frame characterizations corresponding to video clips, as described above with respect to 104 in FIG. 1. Comparison logic 410 may include logic to cause processor 402 to compare frame characterizations corresponding to video clips as described above with respect to FIG. 2.

Instructions 404 further include compilation logic 412 to cause processor 402 to compile, or combine selected video clips of a second video to create a new video, as described above with respect to 106 in FIG. 1, and to add one or more features of corresponding video clips of the first video, such as corresponding music tracks, to the new video, as described above with respect to 108 in FIG. 1.

In the example of FIG. 4, video data 422 includes first video data 424, which may include video data corresponding to one or more template videos, which may include one or more music videos. Video data 422 further includes second video data 426, which may include video data corresponding to one or more personal videos.

Video data 422 may include video frame characterization data 428, generated by processor 402 in response to video frame characterization logic 408.

Video data 422 may include compilation video data 430, corresponding to one or more videos compiled by processor 402, from first and second video data 424 and 426, in response to compilation logic 412.

Computer system 400 may include an input/output (I/O) controller 434 to interface between processor 402 and one or more I/O devices, which may include one or more of a user interface device, a display, a network, a video camera, and another computer system.

Computer system 400 may include a communications infrastructure 432 to communicate between processor 402, memory/storage 403, and I/O controller 434.

Instructions 404 may include graphical user interface (GUI) instruction to cause processor 402 to present features on a display screen. FIG. 5 is an exemplary GUI 500, including user-selectable personal videos 502 and user-selectable template videos 504A-E. GUI 500 further includes a compilation video player 506 to display a compilation video 508, generated by processor 402 from a selected one of personal videos 502 and a selected one of template videos 504.

One or methods and systems disclosed herein, or portions thereof, may be implemented with parallel processing, and may scale with additional threads or cores.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

One skilled in the art will recognize that these functional building blocks can be implemented by discrete components, application specific integrated circuits, processors executing appropriate software, and combinations thereof.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

What is claimed is:

1. A machine-implemented method, comprising:
   segmenting a first video stream into a set of first video clips, wherein the first video stream includes an audio track having a rhythm that correlates to visual changes in the first video stream;
   characterizing video frames of the first video clips of the first video stream with respect to multiple visual features; and
   editing a second video stream based on the visual feature characterizations of the video frames of the first video clips of the first video stream, including,
      segmenting the second video stream to provide a set of second video clips,
      characterizing video frames of the second video clips of the second video stream with respect to the multiple visual features,
      selecting one of the second video clips of the second video stream for each of the first video clips of the first video stream based on similarity of the visual feature characterizations of the corresponding video frames, and
      combining the selected second video clips of the second video stream and the audio track of the first video stream to provide an edited video stream in which the audio track rhythm correlates to visual changes in the edited video stream.

2. The method of claim 1, wherein:
   the multiple video features include a visual feature of an animate body;
   the first video stream includes a first animate body having motion that correlates to the audio track rhythm;
   the second video stream includes a second animate body;
   the selecting includes selecting one of the second video clips of the second video stream based in part on similarity of characterizations of the visual feature of the first and second animate bodies; and
   the combining includes combining the selected second video clips of the second video stream and the audio track of the first video stream to provide the edited video stream in which the audio track rhythm correlates to motion of the second animate body in the edited video stream.

3. The method of claim 2, wherein the animate body visual feature includes at least one of:
   a number of faces;
   facial positioning;
   facial perspective;
   facial motion, determined relative to one or more adjacent video frames; and
   facial expression.

4. The method of claim 1, wherein the multiple visual features include camera motion relative to one or more adjacent video frames.

5. The method of claim 1, wherein the multiple visual features include at least one of blur, lightness, hue count, edge distribution, and color distribution.

6. The method of claim 1, further including:
   identifying an object in the first video stream that changes with respect to at least one of size and position over multiple video frames;

generating a predictive binary mask based on the changes in the object in the first video stream to predict pixels encompassed by the object in each of the multiple video frames; and applying the predictive binary mask to video frames of the first video clips of the first video stream and to video frames of the second video clips of the second video stream to identify a set of pixels in each of the video frames;

wherein the multiple visual features include a visual feature of the identified sets of pixels.

7. The method of claim 6, wherein the identifying an object includes:

segmenting each of multiple video frames of a video clip of the first video stream into multiple regions based on at least one of color and texture of corresponding pixels;

computing optical flow motion information for the regions based on an optical flow motion estimation technique; and clustering the regions based on similarities in the optical flow motion information, wherein one of the clustered regions corresponds to the object.

8. The method of claim 1, wherein the selecting includes determining a measure of correlation between video clips of the first and second video streams as:

$$\text{correlation}(r) = \frac{N \sum X_i Y_j - (\sum X_i)(\sum Y_j)}{\sqrt{[N \sum X_i^2 - (\sum X_i)^2][N \sum Y_j^2 - (\sum Y_j)^2]}}$$

computed for i=1 to i=m and for j=1 to j=n, where, n is an integer number of video frames of the first video clip, m is an integer number of video frames of the second video clip, $X_i$ and $Y_j$ represent multi-dimensional feature characterizations for video frames of the first and second video clips, respectively, N is an integer number of dimensions of the multi-dimensional feature characterizations, and N is greater than 1.

9. A non-transitory computer readable medium encoded with a computer program including instructions to cause a processor to:

segment a first video stream into a set of first video clips, wherein the first video stream includes an audio track having a rhythm that correlates to visual changes in the first video stream;

characterize video frames of the first video clips of the first video stream with respect to multiple visual features; and edit a second video stream based on the visual feature characterizations of the video frames of the first video clips of the first video stream, including to, segment the second video stream to provide a set of second video clips, characterize video frames of the second video clips of the second video stream with respect to the multiple visual features, select one of the second video clips of the second video stream for each of the first video clips of the first video stream based on similarity of the visual feature characterizations of the corresponding video frames, and combine the selected second video clips of the second video stream and the audio track of the first video stream to provide an edited video stream in which the audio track rhythm correlates to visual changes in the edited video stream.

10. The computer readable medium of claim 9, wherein the multiple video features include a visual feature of an animate body, the first video stream includes a first animate body having motion that correlates to the audio track rhythm, and the second video stream includes a second animate body, and wherein the instructions include instructions to cause the processor to:

select one of the second video clips of the second video stream based in part on similarity of characterizations of the visual feature of the first and second animate bodies; and combine the selected video clips of the second video stream and the audio track of the first video stream to provide the edited video stream in which the audio track rhythm correlates to motion of the second animate body in the edited video stream.

11. The computer readable medium of claim 10, wherein the animate body visual feature includes at least one of:

a number of faces;

facial positioning;

facial perspective;

facial motion, determined relative to one or more adjacent video frames; and facial expression.

12. The computer readable medium of claim 9, wherein the multiple visual features include camera motion relative to one or more adjacent video frames.

13. The computer readable medium of claim 9, wherein the multiple visual features include at least one of blur, lightness, hue count, edge distribution, and color distribution.

14. The computer readable medium of claim 9, further including instructions to cause the processor to:

identify an object in the first video stream that changes with respect to at least one of size and position over multiple video frames;

generate a predictive binary mask based on the changes in the object of the first video stream to predict pixels encompassed by the object in each of the multiple video frames; and apply the predictive binary mask to video frames of the first video clips of the first video stream and to video frames of the second video clips of the second video stream to identify a set of pixels in each of the video frames;

wherein the multiple visual features include a visual feature of the identified sets of pixels.

15. The computer readable medium of claim 14, further including instructions to cause the processor to:

segment each of multiple video frames of a video clip of the first video stream into multiple regions based on at least one of color and texture of corresponding pixels;

compute optical flow motion information for the regions based on an optical flow motion estimation technique; and cluster the regions based on similarities in the optical flow motion information, wherein one of the clustered regions corresponds to the object.

16. The computer readable medium of claim 9, further including instructions to cause the processor to determine a measure of correlation between video clips of the first and second video streams as:

$$\text{correlation}(r) = \frac{N\sum X_i Y_j - (\sum X_i)(\sum Y_j)}{\sqrt{[N\sum X_i^2 - (\sum X_i)^2][N\sum Y_j^2 - (\sum Y_j)^2]}}$$

computed for i=1 to i=m and for j=1 to j=n, where,
  n is an integer number of video frames of the first video clip,
  m is an integer number of video frames of the second video clip,
  $X_i$ and $Y_j$ represent multi-dimensional feature characterizations for video frames of the first and second video clips, respectively,
  N is an integer number of dimensions of the multi-dimensional feature characterizations, and
  N is greater than 1.

17. A system, comprising a video editor configured to:
  segment a first video stream into a set of first video clips, wherein the first video stream includes an audio track having a rhythm that correlates to visual changes in the first video stream;
  characterize video frames of the first video clips of the first video stream with respect to multiple visual features; and
  edit a second video stream based on the visual feature characterizations of the video frames of the first video clips of the first video stream, including to,
    segment the second video stream to provide a set of second video clips,
    characterize video frames of the second video clips of the second video stream with respect to the multiple visual features,
    select one of the second video clips of the second video stream for each of the first video clips first video stream based on similarity of the visual feature characterizations of the corresponding video frames, and
    combine the selected second video clips of the second video stream and the audio track of the first video stream to provide an edited video stream in which the audio track rhythm correlates to visual changes in the edited video stream.

18. The system of claim 17, wherein the multiple video features include a visual feature of an animate body, the first video stream includes a first animate body having motion that correlates to the audio track rhythm, and the second video stream includes a second animate body, and wherein the video editor is further configured to:
  select one of the second video clips of the second video stream based in part on similarity of characterizations of the visual feature of the first and second animate bodies; and
  combine the selected second video clips of the second video stream and the audio track of the first video stream to provide the edited video stream in which the audio track rhythm correlates to motion of the second animate body in the edited video stream.

19. The system of claim 18, wherein the animate body visual feature includes at least one of:
  a number of faces;
  facial positioning;
  facial perspective;
  facial motion, determined relative to one or more adjacent video frames; and
  facial expression.

20. The system of claim 17, wherein the video editor is further configured to characterize the video frames of the first and second video clips with respect to camera motion, determined relative to one or more adjacent video frames.

21. The system of claim 17, wherein the video editor is further configured to characterize the video frames of the first and second video clips with respect to image quality, including at least one of blur, lightness, hue count, edge distribution, and color distribution.

22. The system of claim 17, wherein the video editor is further configured to:
  identify an object in the first video stream that changes with respect to at least one of size and position over multiple video frames;
  generate a predictive binary mask based on the changes in the object of the first video stream to predict pixels encompassed by the object in each of the multiple video frames; and
  apply the predictive binary mask to video frames of the first video clips of the first video stream and to video frames of the second video clips of the second video stream to identify a set of pixels in each of the video frames;
  wherein the multiple visual features include a visual feature of the identified sets of pixels.

23. The system of claim 22, wherein the video editor is further configured to:
  segment each of the multiple video frames of a video clip of the first video stream into multiple regions based on at least one of color and texture of corresponding pixels;
  compute optical flow information for the regions based on an optical flow motion estimation technique; and
  cluster the regions based on similarities in the optical flow information, wherein one of the clustered regions corresponds to the object.

24. The system of claim 17, wherein the video editor is further configured to determine a measure of correlation between video clips of the first and second video streams as:

$$\text{correlation}(r) = \frac{N\sum X_i Y_j - (\sum X_i)(\sum Y_j)}{\sqrt{[N\sum X_i^2 - (\sum X_i)^2][N\sum Y_j^2 - (\sum Y_j)^2]}}$$

computed for i=1 to i=m and for j=1 to j=n, where,
  n is an integer number of video frames of the first video clip,
  m is an integer number of video frames of the second video clip,
  $X_i$ and $Y_j$ represent multi-dimensional feature characterizations for video frames of the first and second video clips, respectively,
  N is an integer number of dimensions of the multi-dimensional feature characterizations, and
  N is greater than 1.

* * * * *